Dec. 4, 1934.   W. P. HOWLAND   1,982,870
ANIMAL TRAP
Filed Aug. 29, 1933
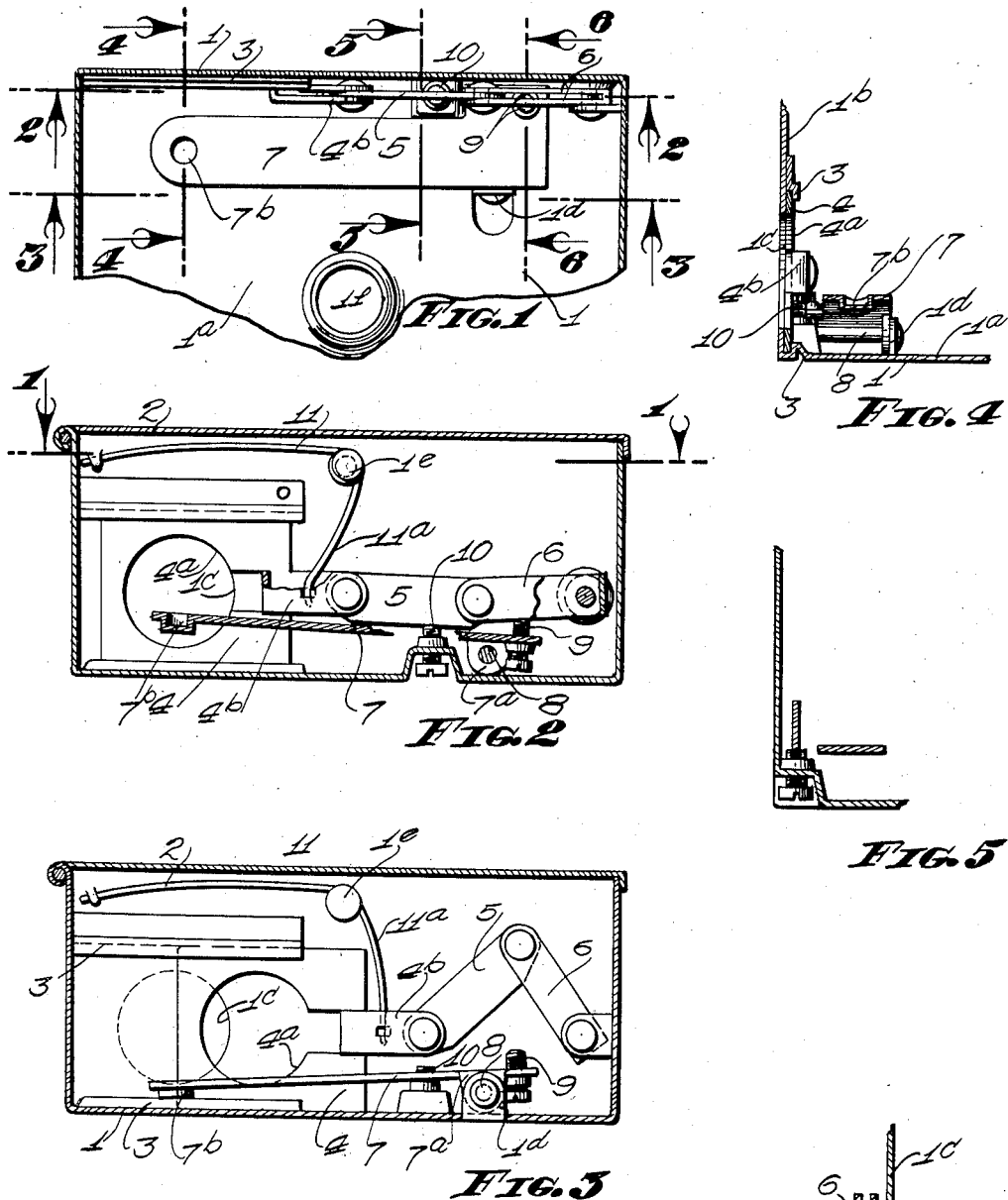
INVENTOR
WINTHROP P. HOWLAND
BY
A. B. Bowman
ATTORNEY Patented Dec. 4, 1934

1,982,870

UNITED STATES PATENT OFFICE 1,982,870

ANIMAL TRAP

Winthrop P. Howland, Pacific Beach, Calif.

Application August 29, 1933, Serial No. 687,300

7 Claims. (Cl. 43—94)

My invention relates to animal traps, and the objects of my invention are:

First, to provide a trap which is particularly suited for the capturing and killing of rodents;

Second, to provide a trap of this class in which the trap is set by engaging a portion thereof remote from the operating element so that all danger of injuring one's fingers is eliminated;

Third, to provide a trap of this class in which the mechanism thereof is closed in a casing, and is so arranged that a number of trap units may be arranged within the margins of said casing;

Fourth, to provide an animal trap in which a large quantity of bait may be fixed therein so as to provide sufficient odor while additional small quantities of bait are placed on the trip members thereby securing sufficient attraction for the animal;

Fifth, to provide a trap of this class which may be readily and quickly set; yet requires only a delicate touch to release or spring the trap; and Sixth, to provide on the whole a novelly constructed animal trap which is durable, efficient in its actions, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application, in which:

Figure 1 is a fragmentary sectional view through 1—1 of Fig. 2; Figs. 2 and 3 are sectional views through 2—2 and 3—3 of Fig. 1; however Fig. 3 shows the trap sprung and Figs. 4, 5, and 6 are fragmentary sectional views through 4—4, 5—5, and 6—6, respectively, of Fig. 1.

Similar characters of reference refer to similar parts and portions throughout the several views of the drawing.

Casing 1, cover 2, guideways 3, gate 4, link 5, arm 6, trip lever 7, journal pin 8, adjustment screws 9 and 10, and operating spring 11 constitute the principal parts and portions of my novel animal trap.

The casing 1 may be in the form of a rectangular box and corporate several trap units. To simplify the illustration the casing is shown fragmentarily, and only one of such trap units is illustrated. The casing 1 has a flat bottom side 1a and vertically extending walls 1b, and is open at its upper side, which side may be provided with a cover 2 hinged to the casing 1.

In one or more of the side walls 1b adjacent one end thereof, there is provided an aperture 1c of sufficient size to receive the head of an animal or rodent. Above and below the aperture 1c there is provided a pair of guideways 3. A gate 4 of sheet material is adapted to fit between the guideways and adjacent the inner side the corresponding wall 1b. Said gate 4 is provided with an aperture 4a of the same size as the aperture 1c, and is adapted to register therewith as shown best in Figs. 2 and 4. The gate 4 moves longitudinally with one edge adjacent the bottom of the casing 1, and is provided at one end with an arm 4b which extends horizontally. Said arm is pivotally connected to one end of a link member 5, the other end of which is pivotally connected to an arm 6. The remaining extremity of the arm 6 is journalled from the side walls 1b of the casing at the end of said wall opposite from the aperture 1c. The bracket or arm 4b, link 5, and arm 6 are adapted to occupy a position in substantial alinement, shown in Fig. 2, when the aperture 4a registers with the aperture 1c, and to move so that the juncture between the link 5 and arm 6 extends upwardly, as shown in Fig. 3, when the gate 4 is moved out of registry with the aperture 1c.

A trip lever 7 is provided. This lever is provided with depending lugs 7a at opposite sides near one end. These lugs are connected by means of a journalled pin 8 to a bracket or other means 1d supported from the casing 1 at its bottom side. The point of support of the lever 7 is approximately opposite the juncture of the link 5 with the arm 6. At a point below the arm 6, when in the position shown in Fig. 2, the trip lever 7 is provided with an adjustment screw 9. Another adjustment screw 10 is supported from the casing 1 below the link 5 when in the position shown in Fig. 2. The trip lever 7 extends along the side walls 1c in spaced relation thereto terminating opposite the aperture 1c. Here the trip lever 7 is provided with a suitable means 7b for holding a small quantity of bait. The journal pin 8 enables the lever to move in a slight arc about an horizontal axis.

Supported from the side walls 1c of the casing by means of a suitable journal 1e is an operating spring 11, one arm of which is anchored at its extremity to the casing, the intermediate portion of which is wrapped about the journal 1e and the remaining arm, designated 11a, of which extends downwardly and engages the arm 4b of the gate 4 in such a manner as to urge the gate to the right, as viewed in Figs. 2 and 3.

Operation of my animal trap is as follows: The trap is set by pressing downwardly on the connection between the link 5 and arm 6 when these members are in position shown in Fig. 3. This pressure is against the spring 11 and moves the gate to position shown in Fig. 2. The adjustment screws 9 and 10 are so adjusted that when the extreme position shown in Fig. 2 is reached, the juncture between the link 5 and arm 6 is slightly below the connection of these members with the arm 4b and the casing. The set screw 10 in particular determines this position while the set screw 9 determines the height to which the bait end of the lever 7 is raised when set. The animal upon detecting the bait at the extremity of the lever 7 extends his head through the apertures 1c and 4a, and in attempting to obtain the bait presses downwardly on the lever 7 causing the link 5 and the arm 6 to be shifted past center whereupon the spring 11 snaps the gate 4 to the position shown in Fig. 3, thus breaking the neck of the animal or crushing whatever portion is engaged.

In order that the scent of the bait may be accentuated, there is provided within the casing 1 a means 1f adapted to contain or secure a large quantity of bait.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In an animal trap, a casing having an aperture therein, a gate having an opening adapted to register with said aperture, link and lever means connected with said gate and casing, arranged to occupy a slight over-center position, an element for urging said gate out of registry with said aperture said element being restrained when said link and lever means is over-center, and a trip lever having a portion in proximity to said aperture and opening and a portion engageable with said link and lever means to shift the same into a position responsive to said element.

2. In an animal trap, a pair of relatively movable members each having apertures adapted to register, link and lever means connecting said members, yieldable means for urging said members until their apertures are out of registry, said link and lever means having a position in which the yieldable means is restrained, a trip having a portion disposed in proximity to said apertures and a portion engageable with said link and lever means to shift the same out of its restraining position whereby said yieldable means may act.

3. In an animal trap, a casing having apertures in its side walls, a trap unit associated with each aperture including, a gate fitted against the wall of said casing and having an opening arranged to register with an aperture, means urging said opening out of registry with said aperture whereby an animal is crushed between the casing and gate, link and lever mechanism connecting said gate and casing and having an over-center position whereby the means is restrained, and a trip lever engageable with said link and lever mechanism shifting the same from its over-center position to release said means.

4. In an animal trap, a casing having an aperture therein, a gate having an opening adapted to register with said aperture, link and lever means connected with said gate and casing, arranged to occupy a slight over-center position, an element for urging said gate out of registry with said aperture said element being restrained when said link and lever means is over-center, and a trip lever having a portion in proximity to said aperture and opening and a portion engageable with said link and lever means to shift the same into a position responsive to said element, and a device for determining the over-center position of said link and lever means.

5. In an animal trap, a casing having an aperture therein, a gate having an opening adapted to register with said aperture, link and lever means connected with said gate and casing, a device for determining the over-center position of said link and lever means, an element for urging said gate out of registry with said aperture said element being restrained when said link and lever means is over-center, and a trip lever including an end disposed in proximity to said aperture and opening, and a member extending into engagement with said link and lever means to shift the same from its over-center position to release said element, said member being adjustable to vary the set position of said trip lever.

6. In an animal trap, a casing having apertures in its side walls, a trap unit associated with each aperture including, a gate fitted against the wall of said casing and having an opening arranged to register with an aperture, means urging said opening out of registry with said aperture whereby an animal is crushed between the casing and gate, link and lever mechanism connecting said gate and casing and having an over-center position whereby the means is restrained, a device for determining the over-center position of said link and lever means, and a trip lever engageable with said link and lever mechanism shifting the same from its over-center position to release said means, and a trip lever including an end disposed in proximity to said aperture and opening, and a member extending into engagement with said link and lever means to shift the same from its over-center position to release said means, said member being adjustable to vary the set position of said trip lever.

7. In an animal trap, a casing having apertures in its side walls, a trap unit associated with each aperture including, a gate fitted against the wall of said casing and having an opening arranged to register with an aperture, means urging said opening out of registry with said aperture whereby an animal is crushed between the casing and gate, mechanism for restraining said means, and a trip engagable with said mechanism for releasing said means, said trip having a portion disposed in proximity to said apertures, said mechanism including a portion remote from said gate engageable to set said mechanism so as to restrain said means.

WINTHROP P. HOWLAND.